(12) United States Patent
Canning

(10) Patent No.: US 6,529,668 B1
(45) Date of Patent: Mar. 4, 2003

(54) ABSORBING LAYER FOR MINIMIZING SUBSTRATE EXPOSURE DURING THE UV WRITING OF A WAVEGUIDE GRATING IN ADDITION TO A BIREFRINGENT CONTROL SYSTEM

(75) Inventor: John Canning, Kogarah (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/700,328

(22) PCT Filed: Jun. 4, 1999

(86) PCT No.: PCT/AU99/00436

§ 371 (c)(1),
(2), (4) Date: Feb. 1, 2001

(87) PCT Pub. No.: WO99/63372

PCT Pub. Date: Dec. 9, 1999

(30) Foreign Application Priority Data

Jun. 4, 1998 (AU) .............................................. PP 3900

(51) Int. Cl.⁷ ................................................ G02B 6/10
(52) U.S. Cl. ..................................... 385/131; 385/129
(58) Field of Search ......................... 385/131, 129–132

(56) References Cited

U.S. PATENT DOCUMENTS 5,620,495 A * 4/1997 Aspell et al. ............... 385/123
5,881,186 A * 3/1999 Starodubov ................. 359/566
5,887,097 A * 3/1999 Henry et al. .................... 372/6
6,341,189 B1 * 1/2002 Deacon ....................... 385/130

FOREIGN PATENT DOCUMENTS

| EP | 724188 A2 | 7/1996 |
| EP | 724188 A3 | 8/1996 |

* cited by examiner

Primary Examiner—Ellen E. Kim
(74) Attorney, Agent, or Firm—Ladas & Parry

(57) ABSTRACT

A waveguide having photosensitive properties is disclosed comprising: a waveguide substrate; a first cladding layer formed on the waveguide substrate; a UV absorbing layer formed on the first cladding layer; a UV sensitive layer having optical transmission properties adapted to be changed with UV irradiation, the layer formed on or closely adjacent the UV absorbing layer; and a second cladding layer, being substantially UV transparent, on the UV sensitive layer. Preferably, there is further provided a third cladding layer intermediate of the UV absorbing layer and the UV sensitive layer. The UV absorbing layer comprises a germanosilicate material. The absorbing layer can be adapted to change a physical property upon UV absorption. The UV absorbing layer can be variable thickness, the thickness being in accordance with predetermined requirements.

12 Claims, 3 Drawing Sheets

ABSORBING LAYER FOR MINIMIZING SUBSTRATE EXPOSURE DURING THE UV WRITING OF A WAVEGUIDE GRATING IN ADDITION TO A BIREFRINGENT CONTROL SYSTEM

FIELD OF THE INVENTION

The present invention relates the field of creating structures within photosensitive waveguides such as those formed on the silicon wafers or the like.

BACKGROUND OF THE INVENTION

The creation of complex structures within a waveguide utilizing UV exposure processing is becoming increasingly popular. Normally, the wafer is subjected to a series of UV processing steps so as to form the structures within the wafer. An example of such a process is illustrated in FIG. 1 which illustrates a section through a wafer which includes a substrate 2 on which is formed normally a first silicon dioxide layer 3 followed by a UV sensitive layer 4 which forms the core of the waveguide and which is in turn followed by a second silicon dioxide layer 5. Normally, UV rays eg. 6 are employed in a controlled manner so as to form structures within the core 4. These structures can include Bragg gratings etc.

Unfortunately, the idealized case of FIG. 1 does not eventuate in all circumstances. As illustrated in FIG. 2, often significant reflections occur at the boundary layer between the layers 2 and 3 such that significant reflections eg. 8 (up to 70% of the UV beam 6) are reflected so as to interfere with the formation of core structures within the photosensitive waveguide 4. As a result of this reflection process, significant loss of contrast is incurred which results in inferior results. Further, excessive UV light is often provided near the boundary layer and is likely to weaken the structure. Of course, damage at the substrate should be prevented. This damage is thought to affect the type of index change which is achieved at the core by changing the substrate stresses.

SUMMARY OF THE INVENTION

It is an object of the present invention to provide for the utilization of a UV absorbing layer so as to increase the contrast of structures written utilizing UV processing steps and to minimise damage at the substrate.

In accordance with a first aspect of the present invention, there is provided a waveguide having photosensitive properties comprising: a waveguide substrate; a first cladding layer formed on the waveguide substrate; a UV absorbing layer formed on the first cladding layer; a UV sensitive layer having optical transmission properties adapted to be changed with UV irradiation, the layer formed on or closely adjacent the UV absorbing layer; and a second cladding layer, being substantially UV transparent, on the UV sensitive layer.

Preferably, there is further provided a third cladding layer intermediate of the UV absorbing layer and the UV sensitive layer.

The UV absorbing layer can comprise a germanosilicate material. The absorbing layer can be adapted to change a physical property upon UV absorption. The UV absorbing layer can be of variable thickness, the thickness being in accordance with predetermined requirements.

In accordance with a further aspect of the present invention, there is provided a method of UV processing a photosensitive waveguide wherein the waveguide can comprise: a waveguide substrate; a first cladding layer formed on the waveguide substrate; a UV absorbing layer formed on the first cladding layer; a UV sensitive layer having optical transmission properties adapted to be changed with UV irradiation, the UV sensitive layer formed on or closely adjacent the UV absorbing layer; and a second cladding layer, being substantially UV transparent, on the UV sensitive layer; the method comprising the step of: UV irradiating only a predetermined portion of the UV sensitive layer.

The UV absorbing layer can be adapted to change its physical properties upon UV irradiation and the method further can comprise the step of: UV irradiating only a predetermined portion of the UV absorbing layer.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

Figure 3:
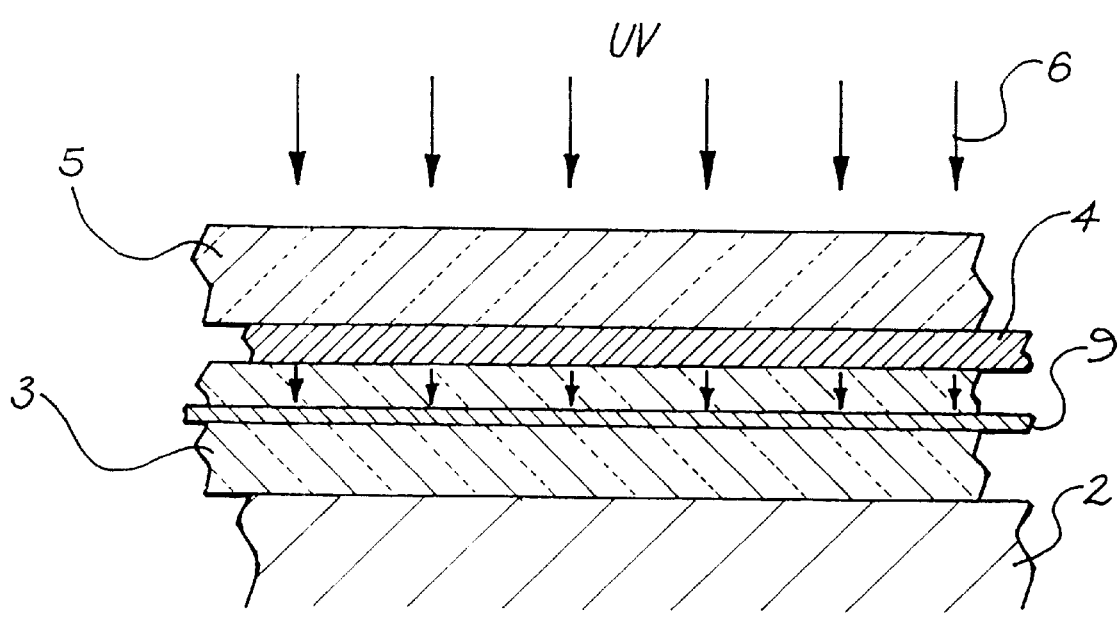
FIG. 3 illustrates the utilization of an absorbing layer in accordance with the principles of the present invention.

In a first embodiment, an independently formed absorbing layer is provided for the absorption of UV beams after they have passed the photosensitive layer. The reflections are suppressed by the absorbing layer leading to improved contrast results. Such an arrangement is illustrated in FIG. 3 wherein a UV absorbing layer 9 is provided between the core layer 4 and the substrate 2. The UV absorbing layer 9 can comprise germanosilicate glass of insufficient thickness to support a transmission mode for the UV light. In this manner, the UV input light 6 which is not absorbed as desired by the layer 4 will be absorbed by the absorbing layer 9 and hence the reflection back to the core layer 4 is dramatically reduced. As a result, the structure contrast will be substantially increased.

Figure 1:
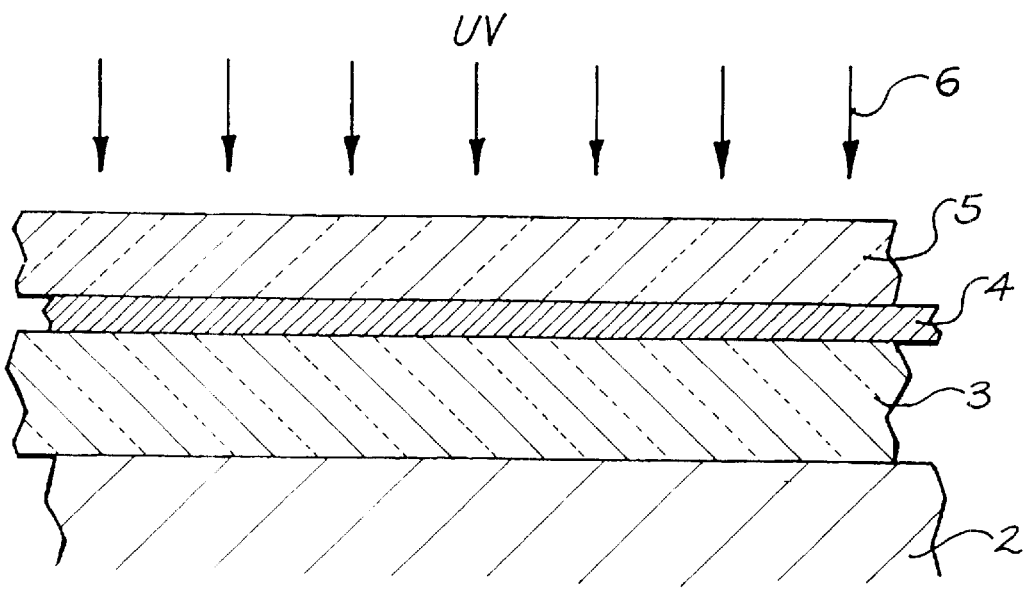
FIG. 1 and FIG. 2 is a schematic sectional illustration of the prior art arrangement of forming UV sensitive photo-waveguides.
Figure 2:
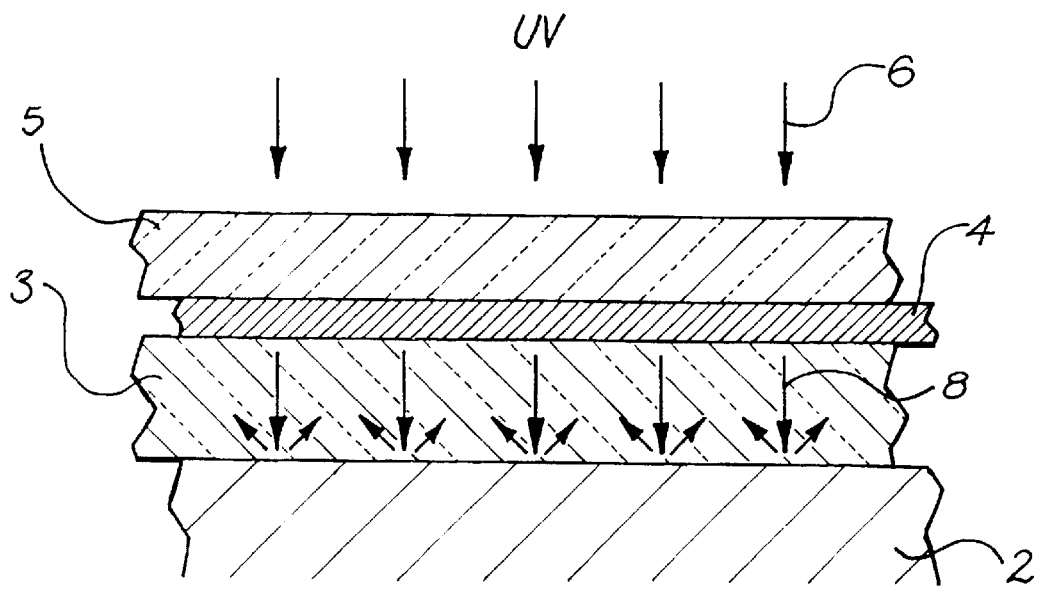

The utilization of the UV absorbing layer of FIG. 2 can be extended to more complex arrangements. For example, it is known that a germanosilicate glass, upon absorption, changes its properties especially in inducing a stress birefringence in the adjacent layers. Hence, where the UV absorbing layer 9 is to be treated in a predetermined asymmetrical manner, then this can be utilized for birefringent control of an optical waveguides.

Figure 4:
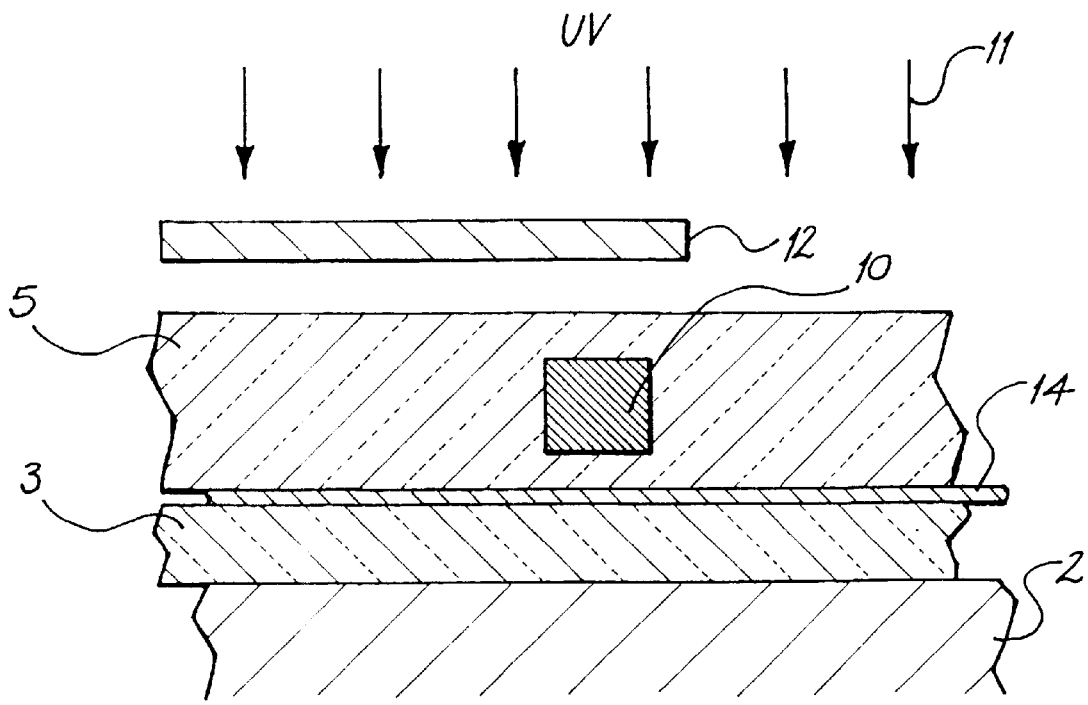
FIGS. 4 and 5 illustrate the process of providing for a non-symmetrical UV processing in accordance with an alternative embodiment of the present invention.

A first example of this process is illustrated in FIG. 4 wherein a core 10 is treated an asymmetrical manner by utilizing a UV blocking barrier 12 which blocks UV light 11 on one side of the core 10 whilst letting UV light through to an absorbing layer 14 on the other side of the core 10. In this manner, an asymmetrical birefringence is induced in the core 10 due to the asymmetrical exposure of the absorbing layer, which can in turn be utilized to provide for unique operational characteristics of the core 10.

Figure 5:
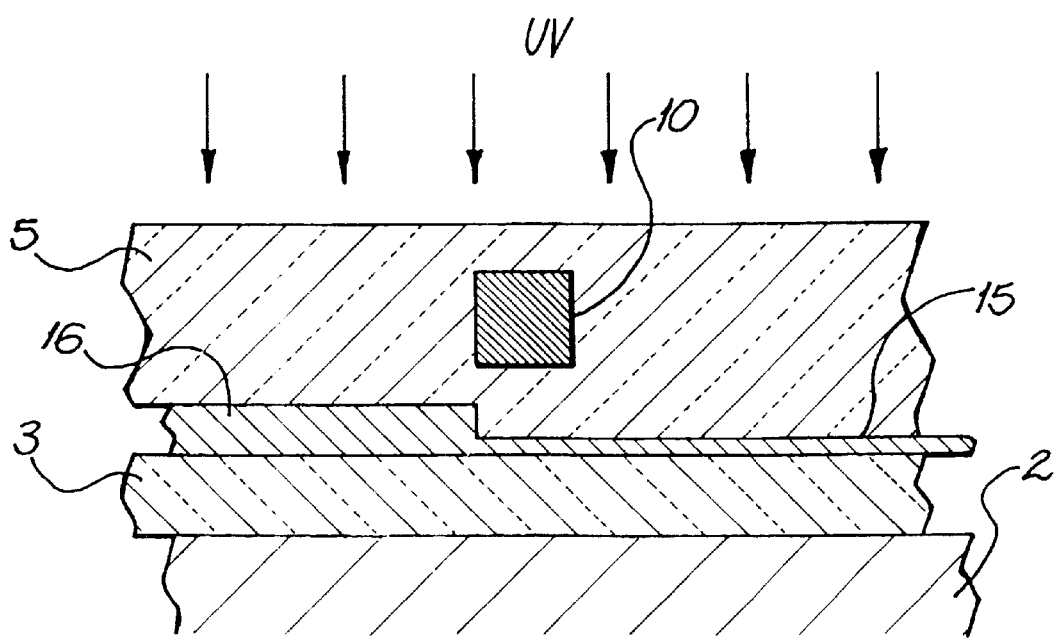

A second arrangement can be as illustrated in FIG. 5 wherein the thickness of the absorbing layer is altered 15, 16 so as to again provide for asymmetrical effects. The thicker layer 16 absorbs UV irradiation to a different degree. Hence, the degree of absorption will again induce an asymmetrical birefringence in the core 10. In this manner, complex circuits can be constructed with the birefringent properties being provided on demand in accordance with requirements.

Hence, the absorbing layer properties can be manipulated such that they prevent light traversing the absorbing layer or result in a refractive index change in the absorbing layer which can be used to adjust properties such birefringence etc. The impact on birefringence is likely to be sensitive to the proximity to the substrate which can be also controlled as part of the deposition process.

The method of the preferred embodiment can be extended to other situations. For example, the absorbing layer can be incorporated into portions of the device during fabrication of layers and the device itself tuned utilizing UV radiation of the layers.

By controlling the absorbing layer properties during deposition or by direct laser or thermal processing. The layer can be tailored for various applications. For example, the layer can be tailored to generate compensating stresses so as to reduce or control substrate stresses which form during deposition or during UV processing.

For example, it is known to deposit a $GeO_2$ layer utilizing, for example, a hollowed cathode CVD process so as to achieve a negative index dilation upon irradiation. The dilation exerts a counter strain to the substrate strains. Hence, by local or blanket irradiation of the absorbing layer, the birefringent properties of the structure can be tuned in accordance with requirements.

It should be further noted that the absorbing layers can be fabricated to achieved the functionality desired through the composition process without requiring subsequent processing. For example, the strain can be introduced to counter substrate stresses utilizing amorphous layers placed in a local or broad area.

It would be appreciated by a person skilled in the art that numerous variations and/or modifications may be made to the present invention as shown in the specific embodiments without departing from the spirit or scope of the invention as broadly described. For example, it would be obvious to the person skilled in the art of thin film deposition to form the absorbing layer from many other materials. The present embodiments are, therefore, to be considered in all respects to be illustrative and not restrictive.

I claim:

1. A waveguide having photosensitive properties comprising:

a waveguide substrate;

a first cladding layer formed on said waveguide substrate;

a UV absorbing layer formed on said first cladding layer;

a UV sensitive layer having optical transmission properties adapted to be changed with UV irradiation, said layer formed on or closely adjacent said UV absorbing layer; and a second cladding layer, being substantially UV transparent, formed on said UV sensitive layer.

2. A waveguide as claimed in claim 1 further comprising:

a third cladding layer intermediate of said UV absorbing layer and said UV sensitive layer.

3. A waveguide as claimed in claim 2 wherein said UV absorbing layer comprises a germanosilicate material.

4. A waveguide as claimed in claim 3 wherein said absorbing layer is adapted to change a physical property upon UV absorption.

5. A waveguide as claimed in any previous claim wherein said UV absorbing layer is of variable thickness, said thickness being in accordance with predetermined requirements.

6. A waveguide as claimed in claim 2 wherein said absorbing layer is adapted to change a physical property upon UV absorption.

7. A waveguide as claimed in claim 1 wherein said UV absorbing layer comprises a germanosilicate material.

8. A waveguide as claimed in claim 7 wherein said absorbing layer is adapted to change a physical property upon UV absorption.

9. A waveguide as claimed in claim 1 wherein said absorbing layer is adapted to change a physical property upon UV absorption.

10. A method of UV processing a photosensitive waveguide wherein said waveguide comprises:

a waveguide substrate;

a first cladding layer formed on said waveguide substrate;

a UV absorbing layer formed on said first cladding layer;

a UV sensitive layer having optical transmission properties adapted to be changed with UV irradiation, said layer formed on or closely adjacent said UV absorbing layer;

and a second cladding layer, being substantially UV transparent, formed on said UV sensitive layer; the method comprising the step of;

UV irradiating only a predetermined portion of said UV sensitive layer.

11. A method as claimed in claim 10 wherein said UV absorbing layer is adapted to change its physical properties upon UV irradiation and said method further comprises the step of:

UV irradiating only a predetermined portion of said UV absorbing layer.

12. A method as claimed in claim 10 or 11 wherein said method is utilized to selectively control the birefringence experienced by said waveguide.

\* \* \* \* \*